United States Patent
Hinz et al.

(10) Patent No.: US 9,557,753 B2
(45) Date of Patent: Jan. 31, 2017

(54) METHOD FOR REGULATING THE VOLTAGE OF A TRANSFORMER

(71) Applicant: Maschinenfabrik Reinhausen GmbH, Regensburg (DE)

(72) Inventors: Ansgar Hinz, Leichlingen (DE); Helmut Proelss, Regensburg (DE); Karsten Viereck, Regensburg (DE)

(73) Assignee: MASCHINEFABRIK REINHAUSEN GMBH, Regensburg (DE)

( * ) Notice: Subject to any disclaimer, the term of this patent is extended or adjusted under 35 U.S.C. 154(b) by 35 days.

(21) Appl. No.: 14/428,176

(22) PCT Filed: Sep. 19, 2013

(86) PCT No.: PCT/EP2013/069446
§ 371 (c)(1),
(2) Date: Apr. 21, 2015

(87) PCT Pub. No.: WO2014/056695
PCT Pub. Date: Apr. 17, 2014

(65) Prior Publication Data
US 2015/0261232 A1    Sep. 17, 2015

(30) Foreign Application Priority Data
Oct. 10, 2012 (DE) .................... 10 2012 109 639

(51) Int. Cl.
*G05F 1/147* (2006.01)
*H02J 3/12* (2006.01)
(Continued)

(52) U.S. Cl.
CPC .............. *G05F 1/147* (2013.01); *H01F 27/29* (2013.01); *H02J 3/12* (2013.01); *H02J 3/1878* (2013.01); *Y02E 40/30* (2013.01)

(58) Field of Classification Search
CPC ............ H02P 21/14; H02P 21/22; H02P 6/18; H02P 21/06; H02P 21/10; H02P 21/141; H02P 21/16; H02P 21/18; H02P 21/30; H02P 9/009; H02M 7/44; H02M 7/53873
See application file for complete search history.

(56) References Cited

U.S. PATENT DOCUMENTS

| | | | | |
|---|---|---|---|---|
| 5,859,521 A | * | 1/1999 | Tajima | .................... H02P 21/08 318/804 |
| 2002/0024828 A1 | * | 2/2002 | Hayashi | .............. H02M 5/4505 363/35 |

(Continued)

FOREIGN PATENT DOCUMENTS

| | | |
|---|---|---|
| DE | 2504278 A | 4/1976 |
| DE | 19728220 B | 3/1999 |
| GB | 1535622 A | 12/1978 |

*Primary Examiner* — Adolf Berhane
*Assistant Examiner* — Henry Lee, III
(74) *Attorney, Agent, or Firm* — Andrew Wilford

(57) ABSTRACT

The invention relates to a method for regulating the voltage of a transformer (1) having different winding taps (3). The problem addressed by the invention is that of providing a method with which different load flow directions can be regulated with conventional transformers (1) and voltage regulators (7) in order to ensure a safe and reliable supply of voltage. The general inventive concept consists in determining, using a method in which a quadrant system (11) is used, the phase angle of the conduction current (I) and thus the load flow direction, thereby preventing deviation from the voltage range as a result of power input that is too high, by controlling the load tap changer (4).

3 Claims, 2 Drawing Sheets

(51) Int. Cl.
*H02J 3/18* (2006.01)
*H01F 27/29* (2006.01)

(56) References Cited

U.S. PATENT DOCUMENTS

| | | | | |
|---|---|---|---|---|
| 2007/0041137 A1* | 2/2007 | Thompson | ............. | H02H 7/045 361/85 |
| 2008/0265809 A1* | 10/2008 | Ol | ....................... | H02P 21/0003 318/139 |
| 2011/0050140 A1* | 3/2011 | Sakai | ...................... | H02P 9/009 318/400.36 |
| 2012/0084037 A1* | 4/2012 | Tanaka | ................... | G01R 27/28 702/85 |
| 2014/0070745 A1* | 3/2014 | Hirono | ................... | H02P 27/06 318/400.32 |

\* cited by examiner

METHOD FOR REGULATING THE VOLTAGE OF A TRANSFORMER

CROSS REFERENCE TO RELATED APPLICATIONS

This application is the US-national stage of PCT application PCT/EP2013/069446 filed 19 Sep. 2013 and claiming the priority of German patent application 102012109639.2 itself filed 10 Oct. 2012.

The invention relates to a method for voltage regulation of a transformer with different winding taps and a voltage regulator.

An arrangement for voltage regulation of a transformer is known from DE 25 04 278, which is in a position of providing compensation for voltage drops by way of vector addition with the help of a resistive impedance, a capacitor and a plurality of potentiometers.

Moreover, a voltage regulator for compensation for power-voltage drop for tapped transformers is known from DE 26 16 798 [GB 1,535,622]. The voltage regulator consists of, inter alia, a current converter connected with the secondary side of the transformer. A resistive impedance and a capacitance that are used for influencing an inductive or capacitive voltage drop, are connected with this current converter. Not only the tap for the resistive voltage drop, but also the tap for the inductive voltage drop can be repoled independently of one another by changeover switches.

A voltage regulator and a method for voltage regulation of a transformer with a tap changer are known from DE 197 28 220. The described voltage regulator, which is for automatic control of transformers by tap changers actuated by a motor drive, is the 'microprocessor-controlled voltage regulator MK30' of the applicant known from the company publication. This voltage regulator activates the motor drive that operates according to the principle of step switching; this produces a voltage change of the transformer winding by one step. A setting command 'higher' or 'lower' is delivered by the voltage regulator to the motor drive if the voltage actual value deviates within predetermined limits from the voltage target value. This known voltage regulator has numerous function buttons and setting elements by which parameterizing of the voltage regulator is undertaken, i.e. specific criteria for the regulation to be undertaken are manually set by the operator.

As can be inferred from the prior art documents, the starting point is always that the load flow direction, namely from the high voltage side to the low voltage side, is always the same. It is assumed that the load flows from the energy generators such as, for example, power stations to the end users such as, for example, industry or private households. Due to this assumption, the known voltage regulators were mounted on the secondary side, thus on the low voltage side. These measure the voltage fluctuations and thus control the voltages of each phase of each leg by on-load tap changers on the primary side of the tapped transformer, thus on the high voltage side. The energy supply has thus always reacted to the user and seeks, via the high voltage side, to selectively regulate the supply voltage delivered at the low voltage side.

Having regard to dwindling fossil fuels for coal power stations as well as the risk emanating from atomic energy there is increasing resort to energy sources from environmentally friendly resources such as, for example, wind, sun, etc. Some of these new energy sources are present with consumers, in the form of solar installations on roofs and the like. These new starting-point situations impose new demands on the infrastructure of energy supply mains, particularly on transformer plants as well as on the methods for control thereof.

The object of the present invention is to indicate a method that is in a position of regulating different load flow directions with conventional transformer plants and voltage regulators so as to ensure a secure and reliable voltage supply.

This object is fulfilled by a method comprising the features of claim 1. The subclaims in that case relate to particularly advantageous developments of the method.

The idea according to the invention consists of using, in the method for voltage regulation, a generator/consumer quadrant system and to reproduce the conduction current therein. As soon as the conduction current is in a consumer quadrant the target value of the voltage regulator is increased. In the case of positioning of the conduction current in a generator quadrant the target value of the voltage regulator is lowered. The fundamental difference between consumer and generator makes it possible to determine the load flow direction and thus prevent harm to the voltage band through a too-high feed power.

According to a further form of embodiment of the method, windings of the winding on the primary side of the transformer are switched off after increase of the voltage value.

According yet a further form of embodiment of the method, windings of the winding on the primary side of the transformer are switched on after lowering of the target value.

The method according to the invention shall be explained in more detail in the following by way of an embodiment.

Figure 1:
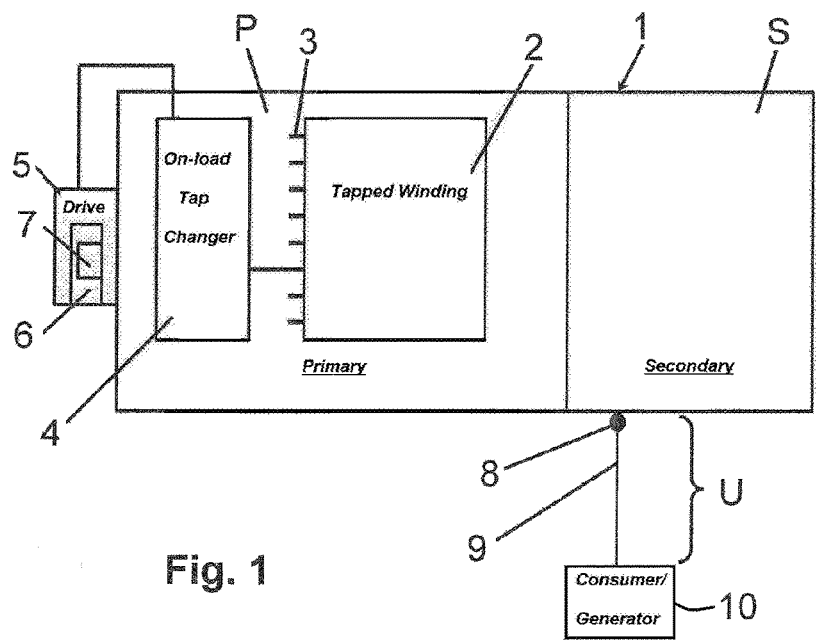
FIG. 1 shows a schematic view of a transformer with necessary means for reliable voltage supply with different load flow directions.

A transformer 1 with a tap winding 2 and different winding taps 3 is depicted in FIG. 1. This has a primary side P and a secondary side S. The winding taps 3 are switched on or switched off by an on-load tap changer 4. The switching-off and switching-on can, however, be realized by any means such as, for example, load selectors, tap changers, etc. The actuation of the on-load tap changer 4 takes place by way of a motor drive 5. This motor drive 5 is controlled by a control 6 and a voltage regulator 7 integrated therein. The voltage regulator 7 detects, at an input point 8, a conduction current I in a line 9 connecting the transformer 1 with a consumer/generator 10. In that case there can obviously also be a plurality of consumers/generators. In addition, the voltage regulator 7 detects a voltage U present between the transformer 1 and the consumers/generators 10.

Figure 2:
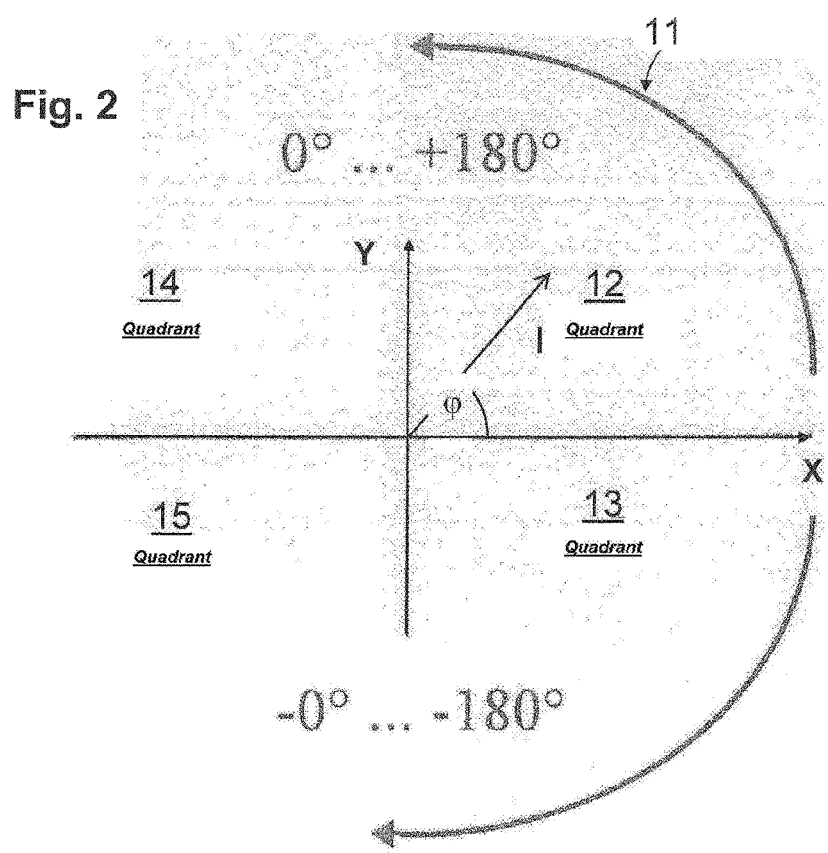
FIG. 2 shows a quadrant system according to the invention.

The quadrant system 11 depicted in FIG. 2 consists of an X-axis X and a Y-axis Y that delimit a first quadrant 12, a second quadrant 13, a third quadrant 14 and a fourth quadrant 15. The actual part of the conduction current I, which is determined by the load of the consumer/generator and the lines, is recorded on the X-axis. The Y-axis represents the imaginary part of the conduction current I. The angle φ between the vector, which represents the conduction current I, and the X-axis reflects the phase displacement. If the angle φ adopts a value between 0° and +180° the conduction current I trails the voltage U, i.e. an inductive generator/consumer is connected. If the angle φ adopts a value between 0° and −180°, the conduction current I leads the voltage U, i.e. a capacitive generator/consumer is connected.

In the prior art it was always assumed that the conduction current I, starting from a consumer directional arrow system, was to be found in the third quadrant 14 or fourth quadrant 15, i.e. different inductive consumers were connected with capacitive or resistive components on the low voltage side.

Figure 3:
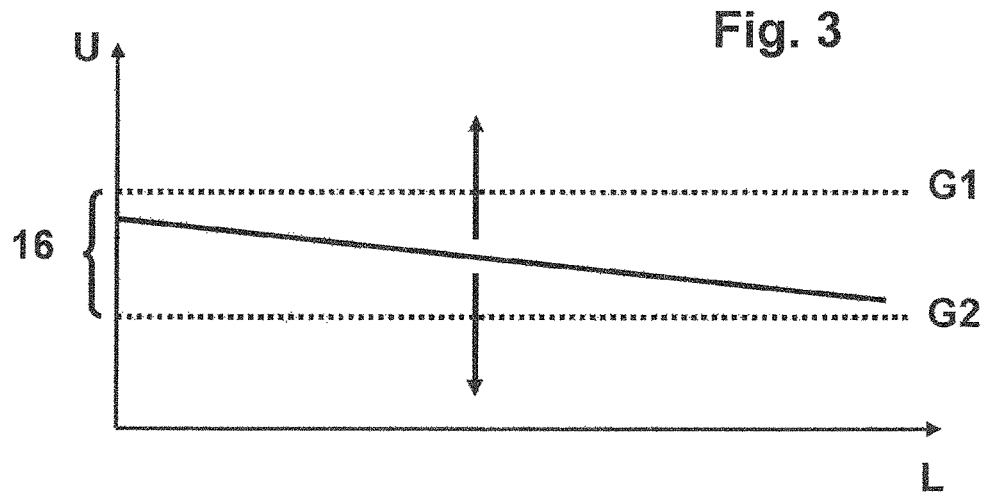
FIG. 3 shows a diagram in which a voltage plot runs in the target value range.

As can be seen in FIG. 3, a voltage drop can move within a target value range 16, which is bounded by an upper voltage limit value G1 and a lower voltage limit value G2, without intervention by the voltage regulator 7 being required. The voltage continuously drops over the length of a line L to the consumers. If the upper voltage limit value G1 or the lower voltage limit value G2 is exceeded intervention by the voltage regulator 7 is required. Otherwise, the voltage drop can be kept within the upper voltage limit value G1 and the lower voltage limit value G2 by switching-on one or more windings of a tapped winding 4 by the on-load tap changer 2 on the primary side P of the transformer 1. The voltage drop lies within the target value range 16 (voltage band).

Since, now, not only consumers, but also generators can be connected on the secondary side S of the transformer 1 it is necessary to be able to reproduce this. These generators are similarly reproduced by the conduction current I. According to the invention it was recognized for the first time that the generators that are similarly represented by the phase positions φ of the conduction current I, are—by contrast to the consumers—reproduced in the first and second quadrants 12, 13. These can similarly comprise inductive or capacitive components.

Figure 4:
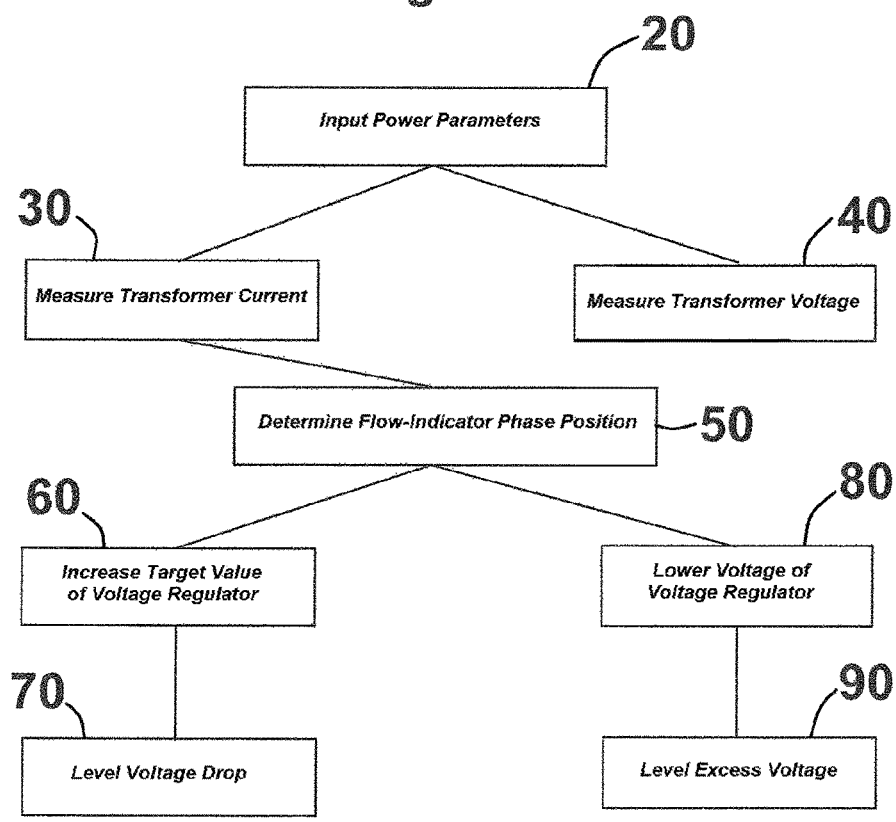
FIG. 4 shows a flow chart according to the invention for the method according to the invention.

The regulating method is illustrated in FIG. 4 as a flow chart. An input of the power parameters of the plant is carried out in the first step 20. By plant there is to be understood, in accordance with the invention, the transformer 1, the on-load tap changer 4 and the lines associated therewith. Also belonging thereto are technical characteristic variables of the transformer 1, the on-load tap changer 4 and the line lengths to the consumers/generators. This method step is usually used in all is regulating methods known from the prior art.

In operation, the second step then takes place, namely the measurement 30 and 40 of, respectively, the conduction current I and the voltage U at the transformer 1. These data are ultimately evaluated by the voltage regulator 7 and used for the purpose of carrying out determination 50 of the position of the conduction current I with the associated phase position in the quadrant system explained in FIG. 2.

If the vector of the conduction current I is now in one of the consumer quadrants, thus in the third or fourth quadrant 14 or 15, an increase 60 in the voltage value $U_s$ of the voltage regulator takes place. This has the consequence that windings, which are on the primary voltage side, of the tap winding of the transformer 1 are switched off; the translation ratio between primary windings and secondary windings is lower. A leveling 70 of the voltage drop as a consequence of a high consumption thus takes place.

If the conduction current is in the generator quadrants, thus in the first or second quadrant 12 or 13, a reduction 80 in the target value of the voltage regulator takes place. Windings of the tapped winding are switched on the primary voltage side; the translation ratio between primary windings and secondary windings is higher. As a result, a leveling 90 of the voltage increase as a consequence of a high power feed is produced. The procedure is filed as an algorithm in a fixed value memory in the voltage regulator.

An advantage of this method is the fundamental difference between consumer and generator on the secondary side of a transformer 1. Ascertaining whether power is fed in or consumed on the secondary side prevents, by adaptation of the transforming ratio of the transformer, a voltage excess, i.e. an exceeding of the limit values of the voltage band 16, from being caused by a high feed power.

A further advantage of this method is that no additional apparatus has to be installed in order to detect and appropriately level the changing load flow. It is possible by the method to use the existing components, for example transformer, voltage regulator, etc.

REFERENCE NUMERAL LIST 1 transformer
2 tapped winding
3 winding taps
4 on-load tap changer
5 motor drive
6 control
7 voltage regulator
8 input point
9 line
10 consumer/generator
11 quadrant system
12 first quadrant
13 second quadrant
14 third quadrant
15 fourth quadrant
16 target value range of the voltage
20 input of the power parameters
30 measurement of the conduction current at the transformer
40 measurement of the voltage at the transformer
50 determination of the phase position of the flow indicator (conduction current) in the quadrant system
60 increase in the target value of the voltage regulator
70 leveling of the voltage drop as a consequence of high consumption
80 lowering of the voltage value of the voltage regulator
90 leveling of the excess voltage as a consequence of high feed power
G1 upper voltage limit value
G2 lower voltage limit value
I conduction current
P primary side
S secondary side
U voltage
φ angle

The invention claimed is:

1. A method for voltage regulation of a transformer with different winding taps and a voltage regulator, comprising the steps of:
   initially determining the conduction current present at the transformer and simultaneously ascertaining the instantaneous voltage present at the transformer;
   using a quadrant system in which a first quadrant and a second quadrant show the phase position φ of the conduction current from generators to the transformer and a third quadrant and a fourth quadrant show the phase position φ of the conduction current from the transformer to the consumers; and
   if the phase position φ of the conduction current is detected in the third quadrant or in the fourth quadrant of the voltage regulator, raising an instantaneous voltage to a target value range or if the phase position $\phi$ of the conduction current is detected in the first quadrant or in the second quadrant of the voltage regulator, lowering an instantaneous voltage to a target value range.

2. The method for voltage regulation according to claim 1, further comprising the step, when the instantaneous voltage is raised to the target value range, of:

switching off windings of the tap winding on the primary side of the transformer.

3. The method for voltage regulating according to claim 1, further comprising the step, when the instantaneous voltage is lowered to the target value range, of switching on windings of the tap winding on the primary side of the transformer.

\* \* \* \* \*